(12) United States Patent
Ramisetty et al.

(10) Patent No.: US 10,833,926 B2
(45) Date of Patent: Nov. 10, 2020

(54) TOUCHLESS SECURE BOOTSTRAPPING OF IOT DEVICES

(71) Applicant: T-Mobile USA, Inc., Bellevue, WA (US)

(72) Inventors: Phani Ramisetty, Sammamish, WA (US); Poornima Magadevan, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 90 days.

(21) Appl. No.: 15/816,694

(22) Filed: Nov. 17, 2017

(65) Prior Publication Data

US 2019/0158355 A1 May 23, 2019

(51) Int. Cl.
| | |
|---|---|
| H04L 12/24 | (2006.01) |
| H04L 29/08 | (2006.01) |
| H04L 29/06 | (2006.01) |
| H04W 8/26 | (2009.01) |
| H04W 4/50 | (2018.01) |
| H04W 4/70 | (2018.01) |
| H04W 8/24 | (2009.01) |
| H04W 60/00 | (2009.01) |
| H04W 8/18 | (2009.01) |
| H04W 84/04 | (2009.01) |

(52) U.S. Cl.
CPC ......... *H04L 41/0806* (2013.01); *H04L 63/04* (2013.01); *H04L 63/0823* (2013.01); *H04L 63/0853* (2013.01); *H04L 63/0892* (2013.01); *H04L 67/12* (2013.01); *H04W 4/50* (2018.02); *H04W 4/70* (2018.02); *H04W 8/265* (2013.01); *H04W 8/183* (2013.01); *H04W 8/24* (2013.01); *H04W 8/245* (2013.01); *H04W 60/00* (2013.01); *H04W 84/042* (2013.01)

(58) Field of Classification Search
CPC . H04L 63/04; H04L 63/0823; H04L 63/0892; H04W 4/50; H04W 4/70
See application file for complete search history.

(56) References Cited

U.S. PATENT DOCUMENTS

| | | | | |
|---|---|---|---|---|
| 8,826,016 | B2 * | 9/2014 | Barriga | H04L 63/061 |
| | | | | 713/168 |
| 9,344,888 | B2 * | 5/2016 | Starsinic | H04W 12/04031 |
| 9,794,905 | B1 * | 10/2017 | Chastain | H04L 63/0876 |

(Continued)

*Primary Examiner* — Lashonda T Jacobs
(74) *Attorney, Agent, or Firm* — Lee & Hayes, P.C.

(57) ABSTRACT

Systems and methods for automatically and securely connecting internet of things (IoT) devices to one or more networks. The system can include a bootstrap server and a configuration database to enable configuration settings for a plurality of IoT devices to be stored and accessed. The bootstrap server can configure an appropriate digital security certificate for an IoT device requesting access to the network. The bootstrap server can then provide a bootstrapping message to the IoT device including the digital certificate and other data. A device management server can then provide a device management message to the IoT device to provide one or more of a final configuration, applications, and software or firmware updates. The system replaces the current system, which is substantially manual, with an essentially "touchless" system that requires little or no input from the user or service provider technicians.

20 Claims, 6 Drawing Sheets

(56) References Cited

U.S. PATENT DOCUMENTS

| | | | | |
|---|---|---|---|---|
| 9,800,621 B2* | 10/2017 | Starsinic | ............ | H04W 12/0023 |
| 10,321,311 B2* | 6/2019 | Sasin | ................. | H04L 63/0823 |
| 10,447,683 B1* | 10/2019 | Loladia | .................. | H04W 4/70 |
| 2003/0233542 A1* | 12/2003 | Benaloh | ................ | H04L 9/3263 |
| | | | | 713/156 |
| 2009/0019167 A1* | 1/2009 | Taaghol | ................ | G06F 9/4416 |
| | | | | 709/228 |
| 2010/0174907 A1* | 7/2010 | Semple | ............ | H04W 12/04031 |
| | | | | 713/169 |
| 2011/0238806 A1* | 9/2011 | Bhat | ....................... | H04L 67/28 |
| | | | | 709/223 |
| 2013/0160094 A1* | 6/2013 | Luo | ......................... | H04L 41/28 |
| | | | | 726/4 |
| 2013/0185560 A1* | 7/2013 | Eld | ......................... | H04L 63/08 |
| | | | | 713/168 |
| 2013/0239189 A1* | 9/2013 | Ionescu | .................. | H04L 63/08 |
| | | | | 726/6 |
| 2014/0304323 A1* | 10/2014 | Alnas | ................. | H04L 41/0816 |
| | | | | 709/203 |
| 2015/0067328 A1* | 3/2015 | Yin | ...................... | H04L 9/3236 |
| | | | | 713/168 |
| 2015/0189459 A1* | 7/2015 | Aon | ....................... | H04W 4/70 |
| | | | | 455/558 |
| 2016/0065556 A1* | 3/2016 | Sasin | ..................... | H04W 4/70 |
| | | | | 726/5 |
| 2016/0234255 A1* | 8/2016 | Bone | ...................... | H04L 63/04 |
| 2016/0248746 A1* | 8/2016 | James | .................. | H04L 9/3268 |
| 2016/0337127 A1* | 11/2016 | Schultz | ................. | H04L 9/3265 |
| 2017/0039373 A1* | 2/2017 | Sasin | ................... | H04L 9/3268 |
| 2017/0041287 A1* | 2/2017 | Pak | ..................... | H04L 12/2859 |
| 2017/0093868 A1* | 3/2017 | Slavov | .................. | H04L 63/10 |
| 2017/0171172 A1* | 6/2017 | Sullivan | ................ | H04L 63/205 |
| 2017/0244600 A1* | 8/2017 | Hussein | .................. | H04L 67/327 |
| 2017/0264597 A1* | 9/2017 | Pizot | .................... | H04L 63/126 |
| 2017/0289944 A1* | 10/2017 | Krajewski | ............ | H04W 48/16 |
| 2017/0295491 A1* | 10/2017 | Gehrmann | .............. | H04W 4/70 |
| 2018/0316673 A1* | 11/2018 | Shah | ................... | H04L 63/0892 |
| 2019/0007836 A1* | 1/2019 | Ocak | .................... | H04W 12/06 |
| 2019/0036875 A1* | 1/2019 | Jimenez | ................ | H04W 88/16 |
| 2019/0036896 A1* | 1/2019 | Khushu | .................. | H04L 63/08 |
| 2019/0052464 A1* | 2/2019 | Doliwa | ................. | H04L 9/0841 |
| 2019/0116087 A1* | 4/2019 | Hiller | .................... | H04W 76/15 |
| 2019/0149316 A1* | 5/2019 | Pala | ..................... | H04L 9/3268 |
| | | | | 713/156 |
| 2019/0149538 A1* | 5/2019 | Friel | ................. | H04W 12/0609 |
| | | | | 726/6 |
| 2019/0156040 A1* | 5/2019 | Sasin | ..................... | G06F 21/44 |

\* cited by examiner

TOUCHLESS SECURE BOOTSTRAPPING OF IOT DEVICES

BACKGROUND

As technology has progressed, more and more devices are capable of connecting to the Internet, creating the so called "Internet of Things" (IoT). Refrigerators can include a touchscreen, for example, to enable users to create a shopping list. The shopping list can then be made available on the Internet to enable the user to access the shopping list on their cell phone, smart phone, or tablet. Similarly, users can adjust temperatures, turn air-conditioning on and off, and perform other functions by connecting to an internet enabled thermostat.

Unfortunately, at present, each IoT device must be manually connected to the Internet. In some examples, this involves the user manually connecting and configuring the device from the device or from a separate computer or smart phone. In other examples, the device may also require a customer service representative from the network provider to manually configure the device from the network side. Obviously, manually onboarding millions of IoT devices over the coming years would require countless man hours, which represents a significant cost.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure can comprise systems and methods for providing touchless, secure bootstrapping of so called, "Internet of Things", or IoT, devices. The system can combine a database of device configurations compiled from one or more network providers, IoT device manufacturers, and/or governing bodies, for example, to provide configuration data for all, or a substantial portion, of current IoT devices. The system can also leverage customer data provided by subscriber identification modules (SIMs) in cellular networks to correlate IoT devices with users and facilitate registration, certification, secure bootstrapping, and registration on various networks.

For ease of explanation, the system is described below as enabling IoT devices to connect to one or more wireless data networks (e.g., Wi-Fi or 4G LTE cellular data networks). One of skill in the art will recognize, however, that similar solutions could be used in 5G, machine-to-machine (M2M), and even future technologies that have not yet been invented. Thus, the use of Wi-Fi, 2G, 3G, and 4G LTE in the discussion below is simply a reflection of current technologies and is not meant to limit the application.

As mentioned above, connecting IoT devices to any network (e.g., a cellular network or the Internet) is currently a predominantly manual operation. This is due in part to a lack of a centralized configuration repository for IoT devices, but also because many of the providers of IoT devices are not themselves network providers. As a result, IoT providers lack the information about users they need to provision IoT devices, while network providers lack the information they need about IoT devices to provision IoT devices. In addition, users may lack the technical knowledge required to connect IoT devices. As a result, this task often falls to customer service or technical service personnel, who connect IoT devices manually on a case-by-case basis.

Obviously, manually connecting the millions of IoT devices that will come online in the coming years to various networks is not a viable long-term solution. To this end, examples of the present disclosure can comprise systems and methods for automatically and securely connecting IoT devices to wireless data networks. The system is described below as a system for connecting to cellular data networks, but could also be used for connected to other wireless and wired networks and wireless technologies (e.g., Wi-Fi, Bluetooth®, etc.) using similar concepts.

Figure 1:
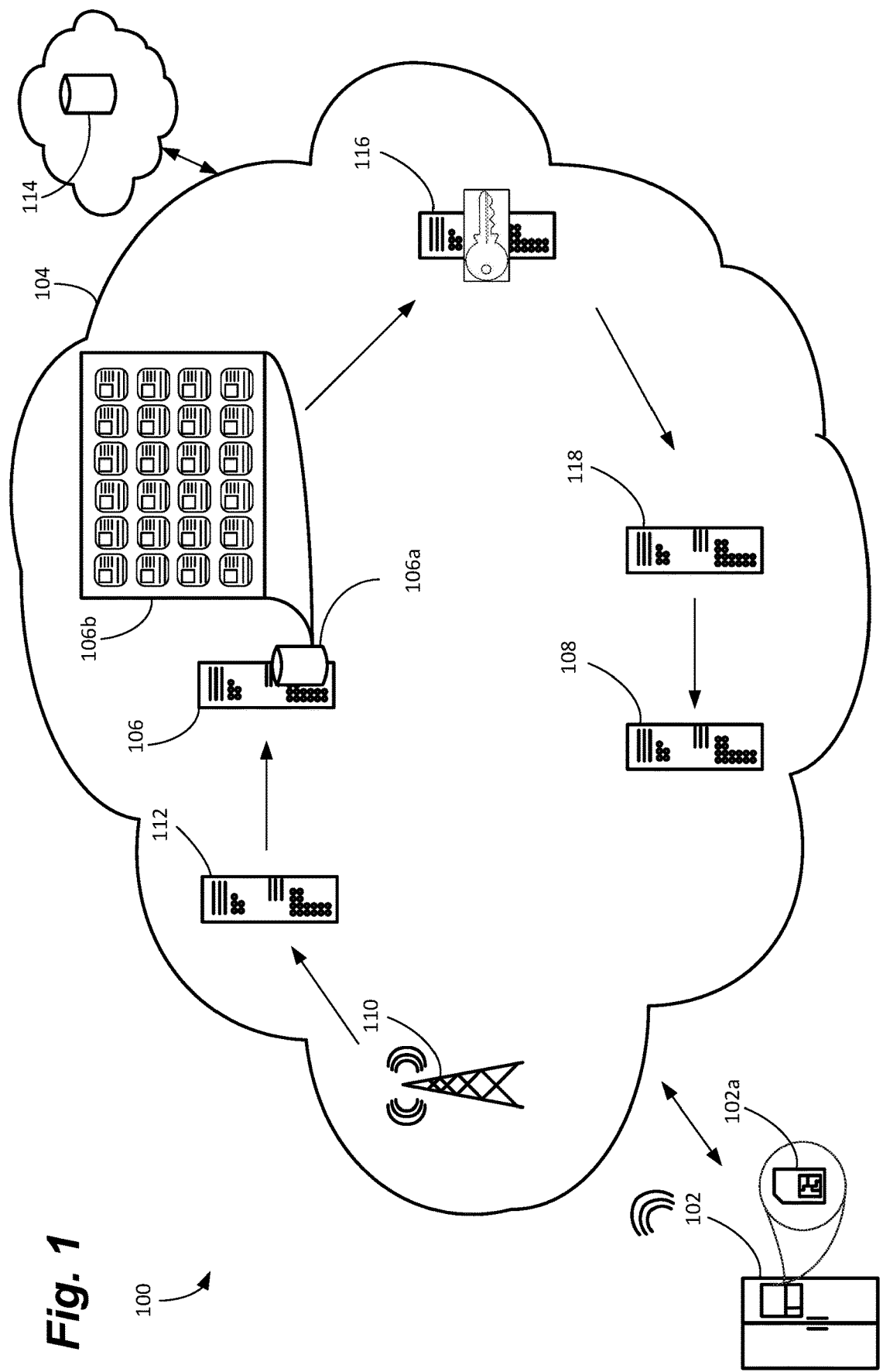
FIG. 1 depicts an example of an automatic, touchless bootstrapping system for internet of things (IoT) devices, in accordance with some examples of the present disclosure.

As shown in FIG. 1, the system 100 can comprise a variety of components configured to connect an IoT device 102 securely to a network 104 (e.g., a cellular data network). To this end, the system 100 can enable an IoT device 102 such as, for example, a refrigerator (shown), thermostat, Raspberry Pi, or other IoT device to be automatically and "touchlessly" (i.e., with little or no input from the user or a technician) connected to the network 104. As mentioned above, at least two issues must be resolved to properly and securely connect the IoT device 102 to the network 104. The first is that the IoT device 102 must be properly provisioned on the network based on its capabilities and security requirement. The second is that the IoT device 102 must be associated with the account of a valid user. In other words, the network 104 requires a user account and billing method, among other things, to allow the IoT device 102 on the network.

Because all of this information does not currently exist in one location and cannot easily be obtained, IoT devices 102 generally must be manually provisioned. If a user buys a Samsung refrigerator, Samsung does not know who purchased the refrigerator, for example, or whether the person has a cellular data plan. Thus, the user may have to call a help line where a technician has information related to the configuration of the IoT device 102, but needs account information from the customer to manually provision the IoT device 102.

The user's cellular provider, on the other hand, obviously has account information related to the user, but does not have configuration information for the refrigerator. To this end, the system 100 disclosed herein can utilize the information available from a SIM 102*a* and a novel bootstrap logic server (hereinafter, "bootstrap server") 106 in concert with a device management server 108 to configure and securely connect IoT devices 102 to the network 104.

The bootstrap server 106 can include a configuration database 106a including configuration files, or configuration profiles, for a plurality of IoT devices 102. In some examples, the configuration database 106a can be stored on the bootstrap server 106. In other examples, the configuration database 106a can be accessible to the bootstrap server 106 via the network 104, for example, or over the Internet.

In either case, the configuration database 106a can be updated periodically to include new IoT devices 102. So, an IoT device 102 that is new to the network 104—i.e., no examples of the IoT device 102 have yet been connected to the network 104—may still need to be manually provisioned. After being provisioned once, however, the profile for the IoT device 102 can then be stored on the bootstrap server 106. Indeed, due to the proliferation of the Internet, in some examples, configuring the IoT device 102 on any network with internet connectivity can make the profile available to the network 104 and the bootstrap server 106. In some examples, as discussed below, configuration profiles may also be available from manufacturers, sanctioning bodies, and other sources via the Internet.

Thus, the bootstrap server 106 can provide the configuration data for the IoT device 102. At the same time, because the network provider provides the SIM 102a, the network 104 already knows the user and/or account associated with the SIM 102a. As such, the system 100 now has all the information required to automatically configure the IoT device 102, which can be done substantially without input from the user or a network technician.

Thus, the IoT device 102—via the SIM 102a—can be connected to a wireless base station (WBS) 110, such as a cell tower, minicell, microcell, etc. The WBS 110, in turn, can be in communication with a provisioning system 112 on the core network. The provisioning system 112 can ensure that the SIM 102a is valid, for example, and has not been canceled or reported stolen. The provisioning system 112 can also ensure the SIM 102a is associated with a user and a valid account type. A SIM 102a associated with a voice only account—i.e., an account that does not include cellular data—for example, may be invalid for use with an IoT device 102 for obvious reasons.

If the SIM 102a is valid, the provisioning system 112 can then retrieve information related to the SIM 102a, the profile for the SIM 102a (e.g., how the SIM 102a is activated on the network 104), and the IoT device 102 from the SIM 102a. In some examples, the provisioning system 112 can also compare the capabilities of the SIM 102a with the capabilities of the IoT device 102 and provision the SIM 102a accordingly. In other words, the SIM 102a may be approved for, or capable of, features not found on the IoT device 102, and vice-versa.

Many SIMs 102a, for example, can be configured to provide only certain kinds of cellular services. Thus, a particular SIM 102a can be voice only, for example, voice and data, or can even be more granular—e.g., voice and data for text messages, but not for internet access. Similarly, IoT devices 102 can have a wide variety of capabilities such as, for example, providing hands-free calling, internet access, text message, voice recognition, syncing, etc. Voice recognition, for example, often require an internet connection to access remote voice recognition servers. Thus, the provisioning system 112 can provide the capabilities of the SIM 102a, while the bootstrap server 106 can determine the capabilities of the IoT device 102 from a configuration profile for the IoT device 102 in the configuration database 106a.

The provisioning system 112 can be in communication with the bootstrap server 106. Thus, the provisioning system 112 can provide the IoT device 102 and SIM 102a data to the bootstrap server 106. The provisioning system 112 can also trigger the certification process. This can be automatically implemented by the bootstrap server 106 upon receiving information for a new IoT device 102 or as the result of a command (e.g., a SIP message) from the provisioning system 112.

The bootstrap server 106 can receive the information for the IoT device 102 and the SIM 102a and initiate the certification process. As mentioned above, the bootstrap server 106 can store, or can have access to, the configuration database 106a. The configuration database 106a can include configuration profiles 106b for a plurality of IoT devices 102. The configuration profiles 106b can comprise, for example, security protocols, communication standards, customer name or account number, rate plan, device capabilities, and other setup information used to connect the IoT device 102 to the network 104.

In some examples, the configuration profiles 106b can be obtained by previous connections to the same, or similar, IoT devices 102. In other words, once a first IoT device 102 of a particular type or model, for example, connects to the network 104 and is manually configured, all subsequent IoT devices 102 of the same type or model can be automatically provisioned. In other examples, the configuration database 106a can be updated periodically by the network provider, manufacturers, and/or the internet databases 114, as discussed below.

In other examples, the bootstrap server 106 can be in communication with one or more internet databases 114. The internet database(s) 114 can include standards bodies such as, for example, the Open Internet Consortium, the Institute of Electrical and Electronic Engineers (IEEE), The Thread Group, and/or the Open Connectivity Foundation. In other words, as these groups ensure that various IoT devices 102 meet the various connectivity standards, they necessarily obtain configuration files for the IoT devices 102 they approve. In some examples, the standards bodies can make these configuration files available to service provides via, for example, the Internet or an intranet.

In other examples, the internet database 114 can also include manufacturers. Samsung obviously has configuration profiles 106b for Samsung devices. Thus, the manufacturer of the IoT device 102 can make the profiles available to the service provider.

In still other examples, the network provider can be in communication with other network providers. In this configuration, as a device is newly provisioned on any (partner) network, the configuration file can be made available to all network providers. Regardless, the configuration database 106a and/or the internet database(s) enable the bootstrap server 106 to locate the appropriate configuration profile for the IoT device 102. This enables the IoT device 102 to be automatically configured, reducing the labor and time required when compared to manual configuration.

With the configuration for the IoT device 102 "in hand," the bootstrap server 106 can request a certificate for the IoT device 102 from a certification authority 116. The certification authority 116 can comprise a secure server on the network 104. While not limited to any specific type of certification, the certification authority 116 can use, for example, pre-shared keys (PSK), X.509, raw public key (RPK), etc., which can be chosen based on the capabilities of the IoT device 102 and the operating model used to onboard the IoT device 102, among other things.

The digital certificate can then be provided to a SIM management system 118 to trigger the certificate to be pushed to the IoT device 102. The certificate can be sent, for example, using a SIM over the air (OTA) message, for example, including the certificate, any necessary configuration files from the bootstrap server 106, and any necessary applications or other data. The SIM OTA message can also include the command to cause the IoT device 102 to initiate the bootstrapping process (discussed below). Of course, in some examples, the IoT device 102 can be programmed to request bootstrapping in response to receiving the certificate. As the name implies, the SIM OTA message can be sent to the SIM wirelessly over the network 104 via, for example, the WBS 110, WiFi, or another type of network.

At this point, the IoT device 102 has a digital certificate, but is still not fully configured on the network 104. As mentioned above, the SIM OTA message may include a command to cause the IoT device 102 to make a bootstrapping request to complete the connection to the network 104. To achieve this, the IoT device 102 can send a new bootstrapping request to the bootstrap server 106. The Bootstrap Protocol (BOOTP) is a computer networking protocol used in IP networks to automatically assign an IP address to network devices, in this case the IoT device 102, from the bootstrap server 106. In response to the request, therefore, the bootstrap server 106 can assign an IP address from a pool of addresses already configured on the network 104.

Once bootstrapped, the IoT device 102 can send a registration request to the device management server 108. The device management server 108 can then send a device management message to the IoT device 102. The device management message can include any additional security or network settings to enable the IoT device 102 to connect to the network 104. In addition, the device management message can include additional applications, software or firmware updates, or any additional data useful to the IoT device 102 and/or the network 104.

At this point, the IoT device 102 has been securely and automatically connected to the network 104. In addition, the IoT device 102 can be provided with any additional software required to operate on the network 104 and can even receive firmware or software upgrades, among other things. Because the bootstrap server 106 includes the necessary configuration files in the configuration database 106a, provisioning of the IoT device 102 on the network 104 can be automatic and "hands free"—i.e., no input is required by the user or the network provider. Thus, the system 100 reduces the labor required by the network provider to provision IoT devices 102 and reduces errors that can be introduced by users and technicians when manually provisioning the IoT devices 102.

Figure 2:
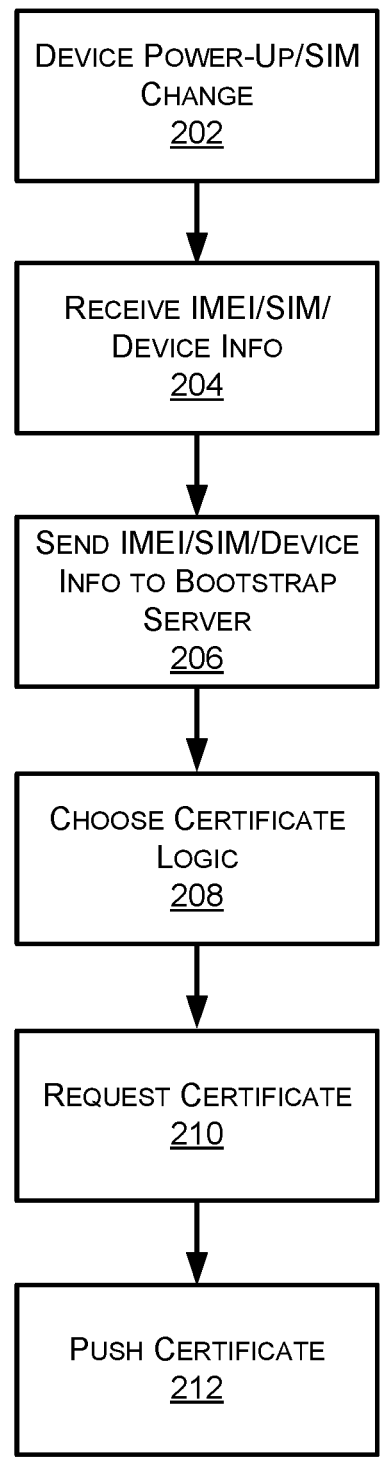
FIG. 2 is a flow chart depicting an example of a method for automatically certificating an IoT device based on a profile for the IoT device located in a configuration database, in accordance with some examples of the present disclosure.

As shown in FIG. 2, examples of the present disclosure can also comprise a method 200 for automatically provided a security certificate to an IoT device 102 to a network 104 during power up or in response to the insertion of a new SIM 102a. As mentioned above, cellular network providers have the advantage of knowing the user and the user's account from information provided by the SIM 102a. The SIM 102a can include, for example, a SIM card number, or integrated circuit card identifier (ICCID), international mobile subscriber identity (IMSI), and (in some cases) the International Mobile Equipment Identity (IMEI), among other things. Thus, if this information could be combined with device configuration information, or configuration profiles, automatic certification and bootstrapping becomes possible.

At 202, therefore, the method 200 can be initiated when the IoT device 102 is powered on for the first time, for example, or a new SIM 102a is inserted. Thus, in some cases, this may be when the IoT device 102 is first purchased, for example, plugged in or powered on, and the IoT device 102 attempts to connect to the network 104. This may also be when the user changes service providers, for example, and inserts a different SIM 102a into the IoT device 102.

At 204, the provisioning system 112 can receive data from the SIM 102a. This can include, for example, the IMEI and SIM ID associated with the SIM 102a. This can also include device information including, for example, the make and model of the IoT device 102 and/or the transceiver type, version number, firmware version, and any other information needed to provision the IoT device 102 on the network 104.

At 206, the provisioning system 112 can send some, or all, of this information to the bootstrap server 106. At 208, based on the configuration information provided from the provisioning system 112, the bootstrap server 106 can locate the IoT device 102 in the configuration database 106a and select a certificate logic. In other words, the certificate can be selected based on the capabilities of the IoT device 102 and/or the user's account. Thus, data only devices can be configured with data only certificates and configurations, voice only devices can be configured with voice only certificates and configurations, and so on.

At 210, based on the configuration data from the configuration database 106a for the IoT device, the bootstrap server 106 can request the certificate from the certificate authority 116. The certificate authority 116 can receive a message from the IoT device 102 with the security profile information from the IoT device 102, for example, and then provide the appropriate certificate to enable the IoT device 102 to connect to the network 104. This can include security settings and certificates including, for example, public/private key encryption, RPK, or other security protocols. As mentioned above, the type of certificate can be based on the network and the capabilities of the IoT device 102, among other things.

At 212, the certification authority 116 can provide the digital certificate to the SIM management system 118. The SIM management system 118 can, in turn, "push" the certificate to the SIM 102a on the IoT device 102. This can be done, for example, using a SIM OTA message. Along with the certificate, the SIM OTA may also include additional configuration data specific to the network 104 or the IoT device 102. Thus, the SIM 102a on the IoT device 102 has now been certificated on the network 104 with an appropriate certificate logic, and the secure bootstrapping process can begin, as discussed below with reference to FIG. 3.

Figure 3:
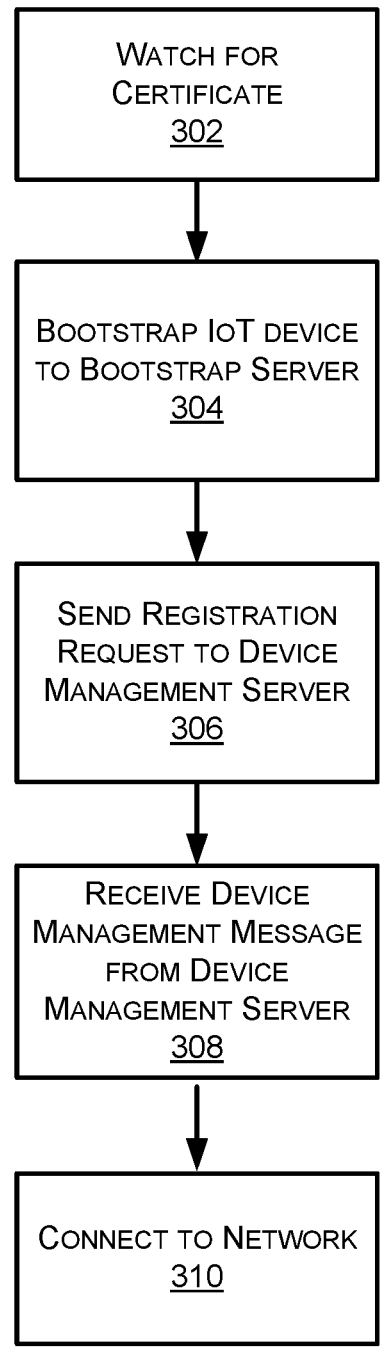
FIG. 3 is a flow chart depicting an example of a method for securely and automatically bootstrapping an IoT device to a cellular network, in accordance with some examples of the present disclosure.

As shown in FIG. 3, examples of the present disclosure can also comprise a method 300 for automatically and securely bootstrapping an IoT device 102 to a network 104 after receiving the security certificate. The bootstrapping process can include additional security settings, firmware updates, software applications, commands, and other data to securely attach the IoT device 102 to the network 104.

At 302, an application on the IoT device 102 can wait, or "listen," for the digital certificate from the SIM management system 118. As mentioned above, the certificate can include various security devices (e.g., public/private key encryption). In some examples, the push to the SIM can also include the IP address of the bootstrap server 106 or the device management server 108 as well as any additional software, commands, or configuration information needed by the IoT device 102 to initiate the bootstrapping process.

At 304, the IoT device 102 can send a new bootstrap request to the bootstrap server 106 using the standard bootstrapping process. Thus, the IoT device 102 has now received a digital security certificate configured to comport with the capabilities of the IoT device 102, SIM 102a, and the user's account (or user provided preferences) and has been securely bootstrapped to the network 104 without intervention from, for example, the user or customer service. Indeed, in many cases, the user need only turn on the IoT device 102 and/or install the SIM 102a (if one is not already installed). The remaining steps in both methods 200, 300 are thus, essentially "touchless."

At 306, once bootstrapped, the IoT device 102 can send a registration request to the device management server 108. The registration request can include, for example, the IMEI, SIM ID, model number, version number, etc. to the device management server 108. This can enable the device management server 108 to provide a properly configured device management message to the IoT device 102 and to update the IoT device 102, as necessary. If the firmware on the IoT device 102 is out of date, for example, the device management message may include a firmware update, for example, or a command to update the firmware with a relevant IP address.

At 308, the device management server 108 can send the device management message to the IoT device 102. As mentioned, the device management message can include updated software or firmware for the IoT device 102. The device management message can also include commands and/or applications and settings to enable the IoT device 102 to safely and securely connect to the network 104. The device management message can also include one or more security settings, set the encryption, and provide other information relevant to accessing the network including, for example, device and/or modem parameters, device data such as temperature, humidity, etc., firmware and/or software versions, etc. At 310, the IoT device 102 can run any updates in the device management message, load applications, and perform other commands provided in the device management message and then connect to the network 104.

Figure 4:
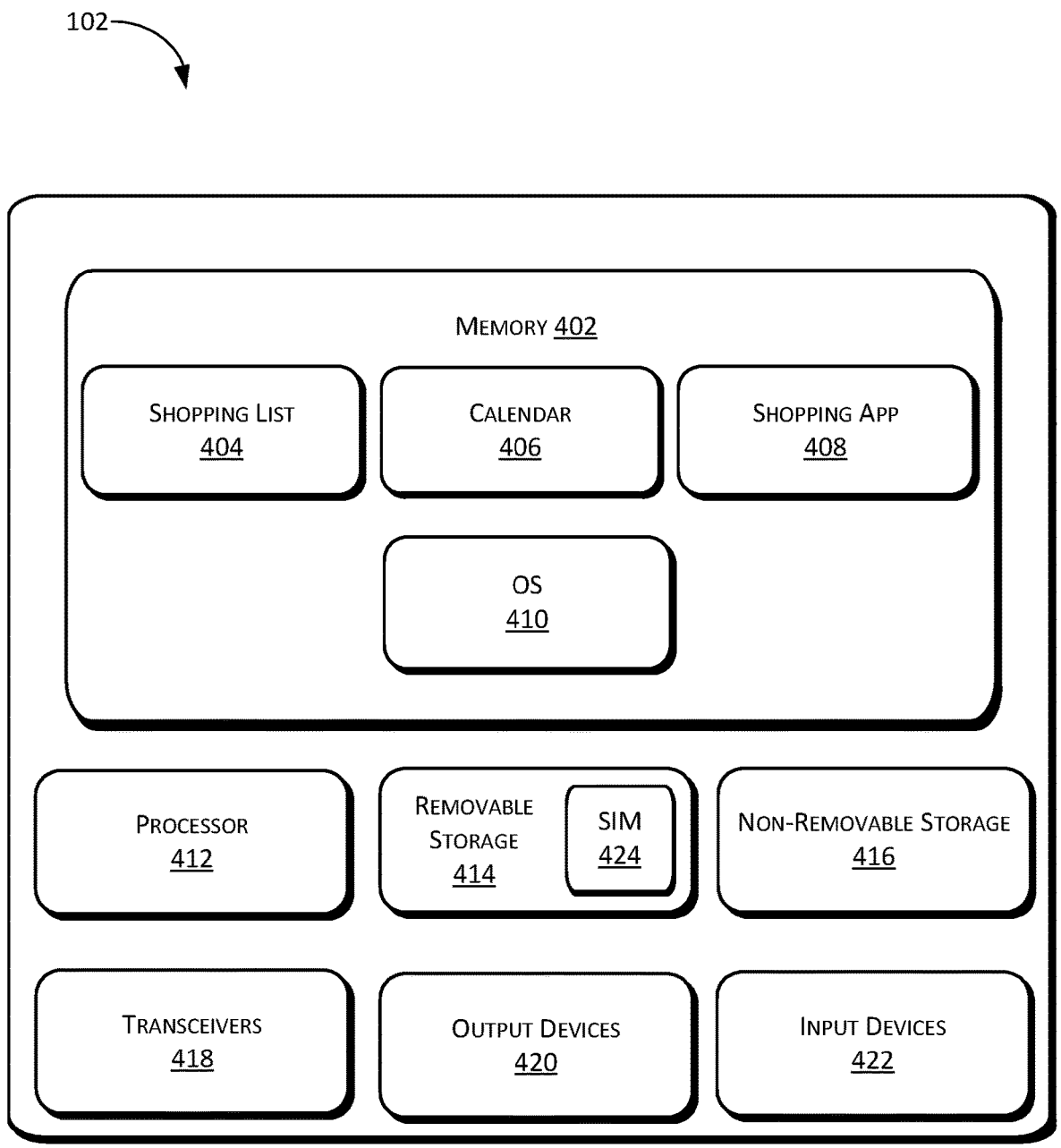
FIG. 4 is an example of a user equipment (UE) for use with the systems and methods disclosed herein, in accordance with some examples of the present disclosure.

As shown in FIG. 4, the systems 100 and methods 200, 300 described herein can be used in conjunction with an IoT device 102 that can comprise a variety of electronic devices. For clarity, the IoT device 102 is described herein generally as an IoT refrigerator. One of skill in the art will recognize, however, that the systems 100 and methods 200, 300 can also be used with a variety of other electronic devices, such as, for example, tablet computers, laptops, desktops, thermostats, light switches, and other network (e.g., cellular or IP network) connected devices. These devices are referred to generically herein as IoT devices 102.

The IoT devices 102 can comprise a number of components to execute the above-mentioned functions. As discussed below, the IoT devices 102 can comprise memory 402 including many common features. In the case of a smart refrigerator, for example, the memory 402 can include the shopping list 404, calendar 406, shopping app 408, and the operating system (OS) 410. The IoT devices 102 can also comprise one or more processors 412. In some implementations, the processor(s) 412 can be a central processing unit (CPU), a graphics processing unit (GPU), or both CPU and GPU, or any other sort of processing unit. The IoT devices 102 can also include one or more of removable storage 414, non-removable storage 416, transceiver(s) 418, output device(s) 420, and input device(s) 422. In some examples, such as for cellular communication devices, the IoT devices 102 can also include the SIM 102a including the IMSI and other relevant information.

In various implementations, the memory 402 can be volatile (such as random access memory (RAM)), non-volatile (such as read only memory (ROM), flash memory, etc.), or some combination of the two. The memory 402 can include all, or part, of the functions 404, 406, 408 and the OS 410 for the IoT devices 102, among other things.

The memory 402 can also comprise shopping list 404. As the name implies, the shopping list 404 can enable users to add things to a list via a touchscreen, or another input device 422. In some examples, the shopping list 404 can include multiple pages, one for each store. The shopping list 404 can then be texted or e-mailed to the user's cell phone, for example, for use when shopping.

In some examples, the memory 402 can also include a calendar 406, or other software, to enable the user to track appointments and calls, schedule meetings, and provide similar functions. The calendar 406 can be synched with a calendar on the user's cell phone, for example, and can enable appointments scheduled on the refrigerator to be transferred to the phone and vice-versa. In some examples, the memory 402 can also comprise shopping app 408 to enable the user to order items directly from an internet commerce provider (e.g., Publix or Amazon).

The memory 402 can also include the OS 410. Of course, the OS 410 varies depending on the manufacturer of the IoT device 102 and currently comprises, for example, iOS 10.3.2 for Apple products and Oreo for Android products. The OS 410 contains the modules and software that supports a computer's basic functions, such as scheduling tasks, executing applications, and controlling peripherals.

The IoT devices 102 may also include additional data storage devices (removable and/or non-removable) such as, for example, data cards, magnetic disks, optical disks, or tape. Such additional storage is illustrated in FIG. 4 by removable storage 414 and non-removable storage 416. The removable storage 414 and non-removable storage 416 can store some, or all, of the functions 404, 406, 408 and/or OS 410.

Non-transitory computer-readable media may include volatile and nonvolatile, removable and non-removable tangible, physical media implemented in technology for storage of information, such as computer readable instructions, data structures, program modules, or other data. The memory 402, removable storage 414, and non-removable storage 416 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the IoT devices 102. Any such non-transitory computer-readable media may be part of the IoT devices 102 or may be a separate database, databank, remote server, or cloud-based server.

In some implementations, the transceiver(s) 418 include any sort of transceivers known in the art. In some examples, the transceiver(s) 418 can include wireless modem(s) to facilitate wireless connectivity with the other IoT devices, cell phones, the Internet, and/or an intranet via a cellular connection. Further, the transceiver(s) 418 may include a radio transceiver that performs the function of transmitting and receiving radio frequency communications via an antenna (e.g., Wi-Fi or Bluetooth®). In other examples, the transceiver(s) 418 may include wired communication components, such as a wired modem or Ethernet port, for communicating with the other IoT devices or the provider's cellular- or internet-based network.

In some implementations, the output device(s) 420 include any sort of output devices known in the art, such as a display (e.g., a liquid crystal or thin-film transistor (TFT) display), a touchscreen display, speakers, a vibrating mechanism, or other tactile feedback mechanism. In some examples, the output devices can play various sounds based on, for example, whether the IoT devices 102 is connected to a network, the type of call being received (e.g., video calls vs. voice calls), or when various applications are opened. Output device(s) 420 also include ports for one or more peripheral devices, such as headphones, peripheral speakers, or a peripheral display.

In various implementations, input device(s) 422 include any sort of input devices known in the art. For example, the input device(s) 422 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 5:
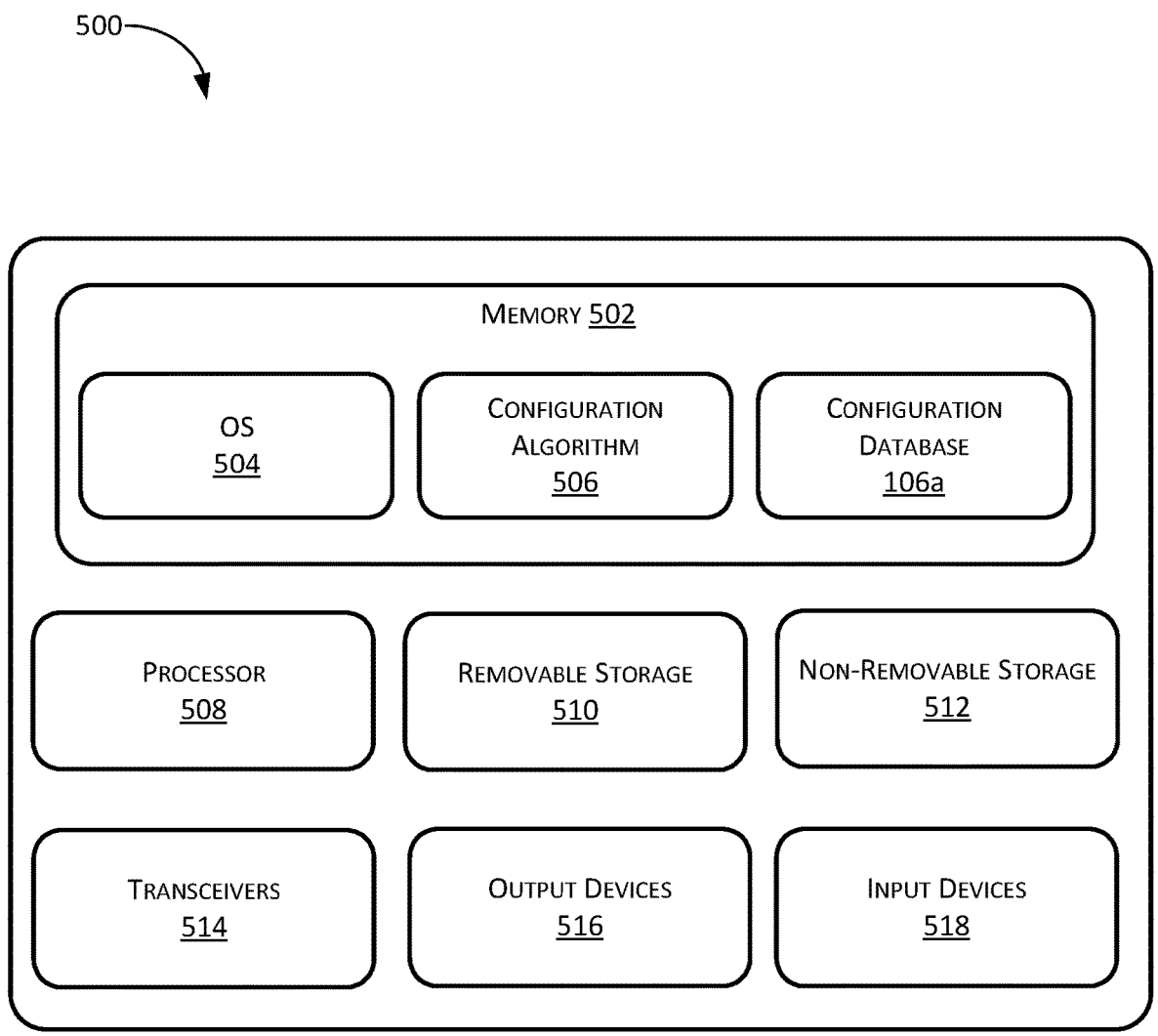
FIG. 5 is an example of a server for use with the systems and methods disclosed herein, in accordance with some examples of the present disclosure.

As shown in FIG. 5, the methods 200, 300 can also be used in conjunction with the bootstrap server 106, the certification authority 116, and other network entities, which can comprise a variety of electronic devices. As mentioned above, the various components of the system 100 and methods 200, 300 such as, for example, the configuration database 106a can be included on, or accessible to, the bootstrap server 106. For ease of explanation, these components 106, 116 are discussed below simply as a server 500. One of skill in the art will nonetheless recognize that the various components of the system 100 and methods 200, 300 could be located in various other components of the cellular network 600 (discussed below) or in a dedicated server. Thus, the server 500 is intended only to simplify the discussion and not to limit the disclosure. The server 500 can comprise, for example, a network entity, a dedicated server, desktop, laptop, tablet, or another type of computing device.

The server 500 can comprise a number of components to execute the above-mentioned functions and apps. As discussed below, the server 500 can comprise memory 502 including many common features such as, for example, the OS 504, a configuration algorithm 506, and the configuration database 106a. The server 500 can also comprise one or more processors 508. In some implementations, the processor(s) 508 can be a central processing unit (CPU), a graphics processing unit (GPU), or both CPU and GPU, or any other sort of processing unit. The server 500 can also include one or more of removable storage 510, non-removable storage 512, transceiver(s) 514, output device(s) 516, and input device(s) 518.

In various implementations, the memory 502 can be volatile (such as RAM), non-volatile (such as ROM, flash memory, etc.), or some combination of the two. The memory 502 can include all, or part, of the functions 506, 106a for the server 500, among other things. The memory 502 can also include the OS 504. Of course, the OS 504 varies depending on the manufacturer of the server 500 and the type of component. Many servers, for example, run Linux or Windows Server. Dedicated cellular routing servers may run specific telecommunications OSs 504. The OS 504 contains the modules and software that supports a computer's basic functions, such as scheduling tasks, executing applications, and controlling peripherals.

In some examples, depending on the server's function, the server 500 can also comprise the configuration algorithm 506. The configuration algorithm 506 can enable the server 500 to receive data from the IoT device 102, retrieve configuration information from the configuration database 106a, and devise an appropriate certificate logic. The configuration algorithm 506 can also request the selected certificate type and features from the certification authority 116. In some examples, the configuration algorithm 506 can be substantially similar to the methods 200, 300 discussed above, but contained in a software or hardware form with the appropriate coding to cause the server 500 to perform the methods 200, 300.

In some examples, the server 500 can also include the configuration database 106a. In some examples, some, or all, of the configuration database 106a can also be stored on a different component, such as a separate server or a cloud-based server bank. Thus, the configuration database 106a can be stored on the server 500 or accessible via, for example, an internet or intranet connection.

The server 500 may also include additional data storage devices (removable and/or non-removable) such as, for example, magnetic disks, optical disks, or tape. Such additional storage is illustrated in FIG. 5 by removable storage 510 and non-removable storage 512. The removable storage 510 and non-removable storage 512 can store some, or all, of the OS 504 and functions 506, 202.

Non-transitory computer-readable media may include volatile and nonvolatile, removable and non-removable tangible, physical media implemented in technology for storage of information, such as computer readable instructions, data structures, program modules, or other data. The memory 502, removable storage 510, and non-removable storage 512 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500 or may be a separate database, databank, remote server, or cloud-based server.

In some implementations, the transceiver(s) 514 include any sort of transceivers known in the art. In some examples, the transceiver(s) 514 can include wireless modem(s) to facilitate wireless connectivity with the other UEs, the Internet, and/or an intranet via a cellular connection. Further, the transceiver(s) 514 may include a radio transceiver that performs the function of transmitting and receiving radio frequency communications via an antenna (e.g., Wi-Fi or Bluetooth®). In other examples, the transceiver(s) 514 may include wired communication components, such as a wired modem or Ethernet port, for communicating with the other UEs or the provider's Internet-based network.

In some implementations, the output device(s) 516 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the server 500 is connected to a network, the type of call being received (e.g., video calls vs. voice calls), the number of active calls, etc. Output device(s) 516 also include ports for one or more peripheral devices, such as headphones, peripheral speakers, or a peripheral display.

In various implementations, input device(s) 518 include any sort of input devices known in the art. For example, the input device(s) 518 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 6:
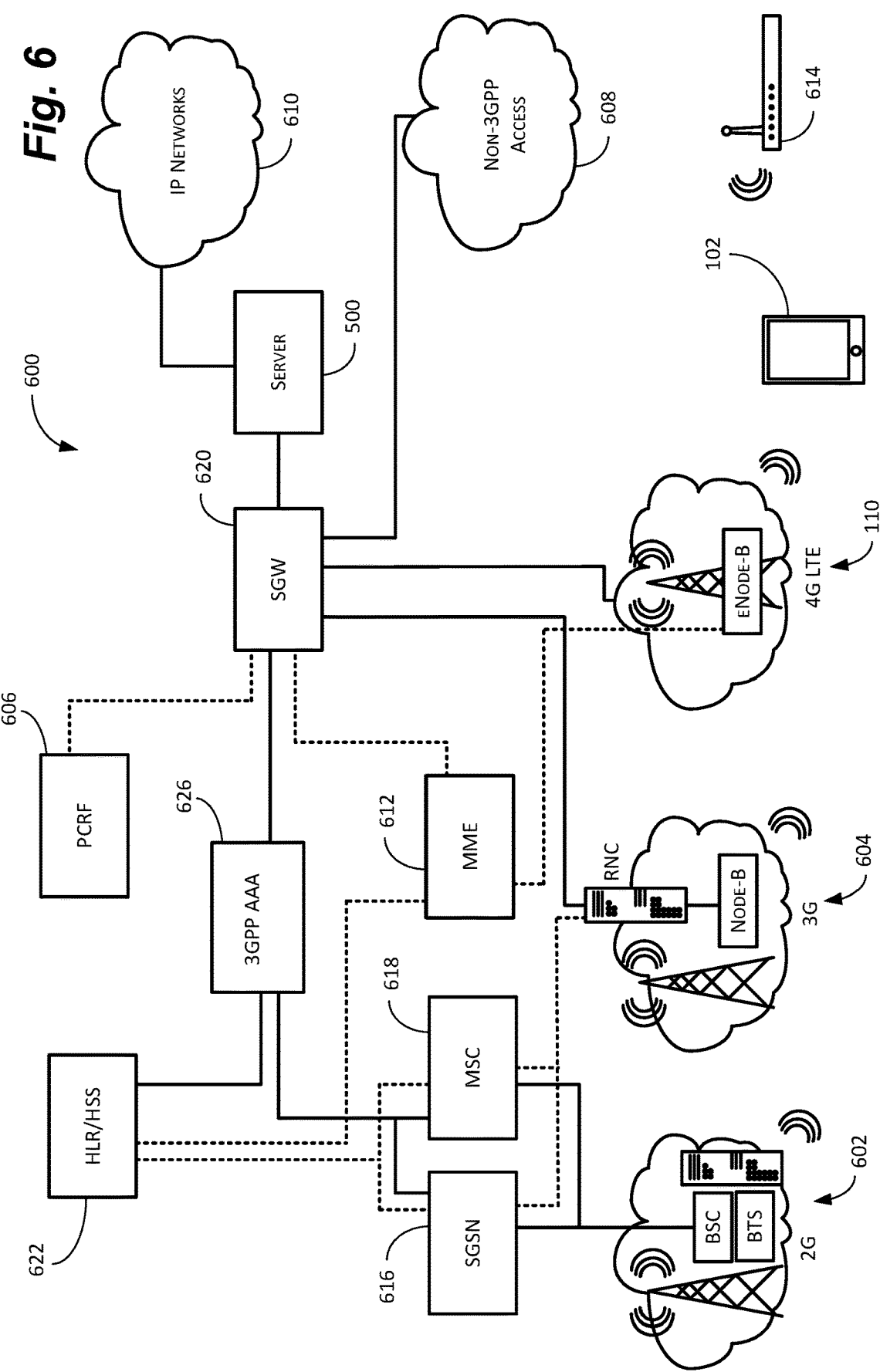
FIG. 6 is an example of a cellular and internet protocol network for use with the systems and methods disclosed herein, in accordance with some examples of the present disclosure.

FIG. 6 depicts a conventional cellular network 600 including 2G 602, 3G 604, and 4G long-term evolution (LTE) components (e.g., the WBS 110). Of course, the server 500 and other current future technologies, such as, for example, 5G and device-to-device (D2D) components could also be included and are contemplated herein. Indeed, many of the existing "back-end" components of the cellular network 600 could handle some, or all, of the functions discussed above. Some, or all, of the aforementioned configuration algorithm 506, for example, the configuration database 106a, and other components could be located on one or more existing components such as, for example, the policy charging rules function (PCRF) 606, serving gateway (SGW) 620, or other components. In other words, the server 500 can be standalone or can be integrated into one of the existing network components.

As is known in the art, data can be routed from the Internet or other sources using a circuit switched modem connection (or non-3GPP connection) 608, which provides relatively low data rates, or via packet switched IP networks 610, which results is higher bandwidth. The LTE network, which is purely IP based, essentially "flattens" the architecture, with data going straight from the internet to the SGW 620 to evolved Node B transceivers, or WBSs 110, enabling higher throughput. Many IoT devices 102 also have wireless local area network (WLAN) 614 capabilities, in some cases enabling even higher throughput. In some cases, cellular carriers may use WLAN communications in addition to, or instead of, cellular communications to supplement bandwidth.

The serving GPRS support node (SGSN) 616 is a main component of the general packet radio service (GPRS) network, which handles all packet switched data within the cellular network 600—e.g. the mobility management and authentication of the users. The mobile switching center (MSC) 618 essentially performs the same functions as the SGSN 616 for voice traffic. The MSC 618 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 618 sets up and releases the end-to-end connection, handles mobility and hand-over requirements during the call, and takes care of charging and real time pre-paid account monitoring.

Similarly, the mobility management entity (MME) 612 is the key control-node for the cellular network 600. It is responsible for idle mode IoT device 102 paging and tagging procedures including retransmissions. The MME 612 is involved in the bearer activation/deactivation process and is also responsible for choosing the SGW 620 for the IoT device 102 at the initial attach and at time of intra-LTE handover involving Core Network (CN) node relocation (i.e., switching from one cell site to the next when traveling). The MME 612 is responsible for authenticating the user (by interacting with the HSS 622 discussed below). The Non-Access Stratum (NAS) signaling terminates at the MME 612 and it is also responsible for generation and allocation of temporary identities to IoT devices 102. The MME 612 is the termination point in the network for ciphering/integrity protection for NAS signaling and handles the security key management. The MME 612 also provides the control plane function for mobility between the cellular network 600 and 2G 602/3G 604 access networks with the S3 interface terminating at the MME 612 from the SGSN 616.

The HSS/HLR 622 is a central database that contains user-related and subscription-related information. The functions of the HSS/HLR 622 include functionalities such as mobility management, call and session establishment support, user authentication and access authorization. The HSS, which is used for LTE connections, is based on the previous HLR and Authentication Center (AuC) from CGMA and GSM technologies, with each serving substantially the same functions for their respective networks.

The PCRF 606 is a software node that determines policy rules in the cellular network 600. The PCRF 606 is generally operates at the network core and accesses subscriber databases (e.g., the HS S/HLR 622) and other specialized functions, such as content handling (e.g., whether the user has sufficient data left in their plan), in a centralized manner. The PCRF 606 is the main part of the cellular network 600 that aggregates information to and from the cellular network 600 and other sources (e.g., IP networks 610). The PCRF 606 can support the creation of rules and then can automatically make policy decisions for each subscriber active on the cellular network 600. The PCRF 606 can also be integrated with different platforms like billing, rating, charging, and subscriber database or can also be deployed as a standalone entity.

Finally, the 3GPP AAA server 624 performs authentication, authorization, and accounting (AAA) functions and may also act as an AAA proxy server. For WLAN 614 access to (3GPP) IP networks 610 the 3GPP AAA Server 624 provides authorization, policy enforcement, and routing information to various WLAN components. The 3GPP AAA Server 624 can generate and report charging/accounting information, performs offline charging control for the WLAN 614, and perform various protocol conversions when necessary.

While several possible examples are disclosed above, examples of the present disclosure are not so limited. For instance, while the systems and methods above are discussed with reference to use with cellular communications, the systems and methods can be used with other types of wired and wireless communications. In addition, while various functions are discussed as being performed on the server 500 and/or various components on the cellular network 600, other components could perform the same or similar functions without departing from the spirit of the invention.

The specific configurations, connections, and network routing can be varied according to particular design specifications or constraints requiring a IoT device 102, system 100, server 500, or methods 200, 300 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
receiving, at a transceiver of a bootstrap server for a cellular network, data from a provisioning system of the cellular network including data associated with an internet of things (IoT) device;
retrieving, with a processor of the bootstrap server, a configuration profile for the IoT device from a configuration database;
selecting, with a processor of the bootstrap server and based on one or more capabilities of the IoT device, a certificate logic for the IoT device of a plurality of certificate logics; and
sending, with the transceiver of the bootstrap server and based on the certificate logic selected for the IoT device, a request for a digital certificate for the IoT device from a certification authority.

2. The method of claim 1, further comprising:
sending, with a transceiver of the certification authority, the digital certificate to a subscriber identity module (SIM) management system.

3. The method of claim 1, wherein retrieving the configuration profile for the IoT device from the configuration database comprises retrieving the configuration profile from a configuration database on a server associated with a manufacturer of the IoT device.

4. The method of claim 1, wherein retrieving the configuration profile for the IoT device from the configuration database comprises retrieving the configuration profile from a configuration database on a server associated with a standards body associated with a certification of the IoT device.

5. The method of claim 1, wherein the data from the provisioning system further comprises data for a SIM associated with the IoT device, the method further comprising:
comparing, with the processor of the bootstrap server, the one or more capabilities of the IoT device and one or more capabilities of the SIM prior to selecting the certificate logic; and
wherein the selecting the certificate logic for the IoT device is further based at least in part the comparing of the one or more capabilities of the IoT device and the one or more capabilities of the SIM.

6. The method of claim 5, wherein the one or more capabilities of the IoT device comprise one or more of: voice calling, text messaging, and internet access.

7. The method of claim 1, wherein the data associated with the IoT device comprises one or more of a model number and a version number of the IoT device;
wherein the configuration profile for the IoT device is based at least in part on the data; and
wherein the selecting the certificate logic is based at least in part on the configuration profile.

8. A method comprising:
sending, with a transceiver of an IoT device, a bootstrapping request to a bootstrap server for a cellular network;
receiving, at the transceiver of the IoT device, a bootstrapping message from the bootstrap server;
applying, with a processor of the IoT device, a digital certificate and one or more settings contained in the bootstrapping message to the IoT device, wherein a type of the digital certificate is selected from a plurality of types of digital certificates based at least in part on one or more capabilities of the IoT device; and
connecting, with the transceiver of the IoT device, to the cellular network based at least in part on the one or more settings in the bootstrapping message.

9. The method of claim 8, wherein the bootstrapping request comprises an international mobile equipment identity (IMEI) and a current firmware version for the IoT device.

10. The method of claim 8, wherein the bootstrapping request comprises at least one of a model number and a version number for the IoT device; and
wherein the bootstrapping message is based at least in part on one or more of the model number and version number of the IoT device.

11. The method of claim 8, further comprising:
sending, with the transceiver of the IoT device, a registration request to a device management server for the cellular network;
receiving, with the transceiver of the IoT device, a device management message from the device management server; and
running, with a processor of the IoT device, one or more applications contained in the device management message.

12. The method of claim 11, wherein running one or more applications contained in the device management message comprises updating a firmware for the IoT device with a firmware version provided in the device management message.

13. The method of claim 8, wherein the bootstrapping message includes one or more security settings for the IoT device.

14. A system comprising:
a bootstrap server associated with a cellular network, the bootstrap server comprising:
one or more transceivers to send and receive one or more transmissions;
memory storing at least a configuration algorithm; and
one or more processors in communication with at least the one or more transceivers and the memory, the configuration algorithm including instructions to cause the bootstrap server to:
receive, at the one or more transceivers, data from a provisioning system of the cellular network including data associated with an internet of things (IoT) device;
retrieve, with the one or more processors, a configuration profile for the IoT device from a configuration database;
select, with the one or more processors and based on one or more capabilities of the IoT device, is a certificate logic for the IoT device of a plurality of certificate logics; and
send, with the one or more transceivers and based on the certificate logic selected for the IoT device, a request for a digital certificate for the IoT device from a certification authority.

15. The system of claim 14, wherein the memory further comprises the configuration database comprising configuration profiles for a plurality of IoT devices.

16. The system of claim 14, further comprising:
a device management server associated with the cellular network, the device management server comprising:
one or more transceivers to send and receive one or more transmissions;

memory storing one or more applications associated with bootstrapping IoT devices; and one or more processors in communication with at least the one or more transceivers and the memory, the memory including instructions to cause the device management server to:

receive, at the one or more transceivers, a registration request from the IoT device;

locate, based on data included in the registration request, a first set of one or more applications associated with the IoT device; and send, with the one or more transceivers, a device management message including the first set of one or more applications.

17. The system of claim 16, wherein the first set of one or more applications includes a firmware update for the IoT device.

18. The system of claim 14, wherein the selecting of the certificate logic for the IoT device is based at least in part on the configuration profile for the IoT device; and wherein the configuration profile includes the one or more capabilities of the IoT device.

19. The system of claim 14, wherein the configuration algorithm further includes instructions to cause the bootstrap server to:

receive, at the one or more transceivers, a bootstrap request from the IoT device;

send, with the one or more transceivers, a bootstrap message to the IoT device;

wherein the memory further stores one or more security settings associated with bootstrapping a plurality of IoT devices;

wherein the bootstrap message further comprises a set of one or more security settings to be applied to the IoT device prior to connecting to the cellular network; and wherein the set of one or more security settings are based at least in part on the data included in the bootstrap request.

20. The system of claim 19, wherein the data included in the bootstrap request includes at least a model number and a software version of the IoT device.

* * * * *